G. A. CUTTER.
ADJUSTABLE ELECTRODE FOR ELECTRIC RIVETING MACHINES.
APPLICATION FILED JUNE 21, 1918.
1,292,438.
Patented Jan. 28, 1919.
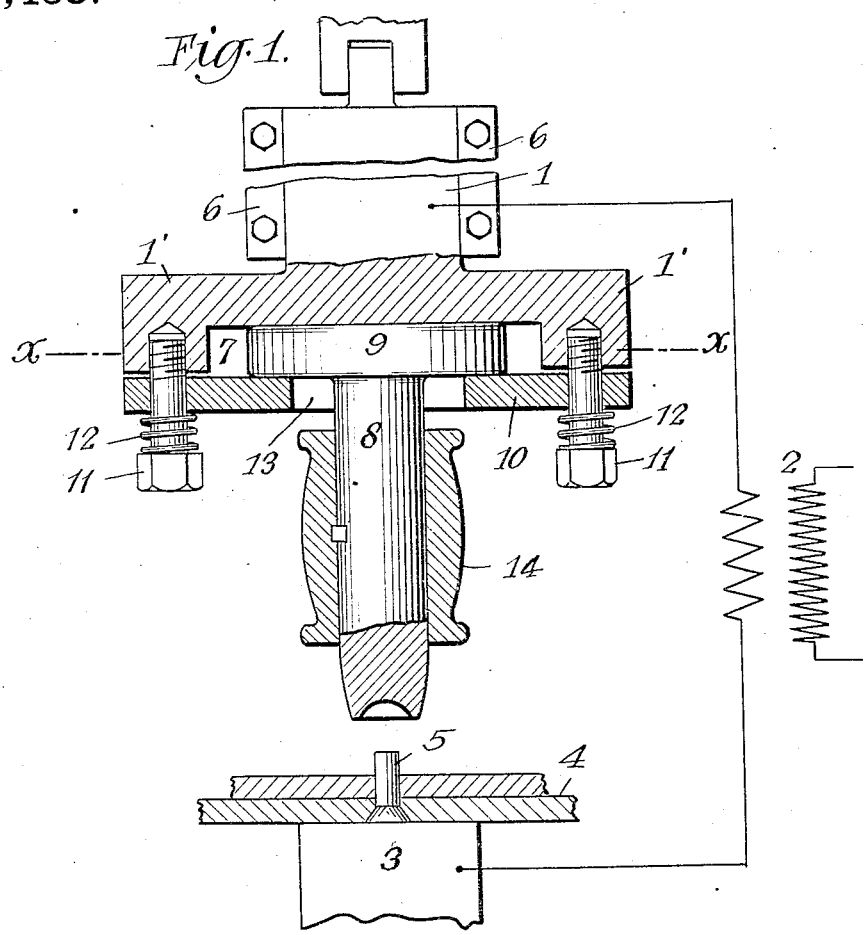
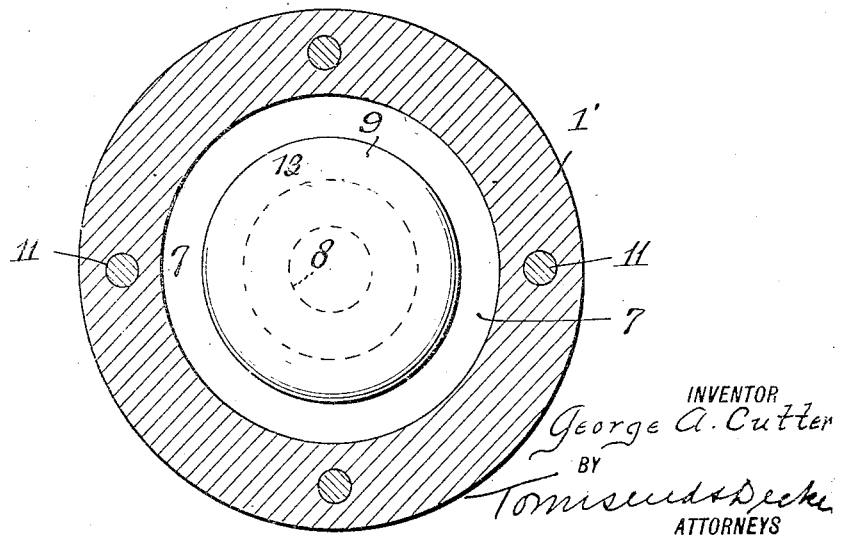
INVENTOR
George A. Cutter
BY
Townsend & Decker
ATTORNEYS

UNITED STATES PATENT OFFICE.

GEORGE ALBERT CUTTER, OF DEDHAM, MASSACHUSETTS, ASSIGNOR TO THOMSON ELECTRIC WELDING COMPANY, OF LYNN, MASSACHUSETTS, A CORPORATION OF MASSACHUSETTS.

ADJUSTABLE ELECTRODE FOR ELECTRIC RIVETING-MACHINES.

1,292,438.  Specification of Letters Patent.  Patented Jan. 28, 1919.

Application filed June 21, 1918. Serial No. 241,118.

*To all whom it may concern:*

Be it known that I, GEORGE ALBERT CUTTER, a citizen of the United States, and a resident of Dedham, in the county of Norfolk and Commonwealth of Massachusetts, have invented certain new and useful Improvements in Adjustable Electrodes for Electric Riveting-Machines, of which the following is a specification.

This invention relates to electric riveting, welding or other metal working machines and has for its object to provide a simple arrangement for adjusting the position of the work-engaging tool or die to bring it into exact vertical line with the part of the work to be operated on.

The invention is particularly useful in machines for electrically heating and heading rivets used in joining sheets or plates of metal together and the invention will be described as carried out in a machine adapted for this purpose but it will be understood that it is not limited to such use.

In handling big work to be riveted by means of an electric riveting machine it is difficult to manipulate the work so that the end of the rivet to be headed will come in exact line with the heating and heading die and much time and labor is consumed in the attempt. By utilizing the present invention, the work is placed on the lower die or against the support in approximately the correct position and then the heading die is manually manipulated to the exact position centrally over or in line with the exposed rivet end. The simplicity of construction and ease of operation of this feature constitutes the principal advantage of the present invention.

In the accompaanying drawings Figure 1 illustrates a general central vertical cross-section through a part of an electric riveting machine having my invention applied thereto.

Fig. 2 is a horizontal section taken on the line *x x* Fig. 1.

As the general construction of electric metal working machines both for riveting and welding is now so well known and as this invention can be applied to any of the standard types of such machines, any detail showing or description of the machine *per se* is considered unnecessary herein; it being deemed sufficient to merely describe the arrangement and mounting of the work-engaging tool or die, which forms the subject of the present invention.

Referring to the drawings, 1 indicates a head constituting one terminal of the secondary of the electric transformer 2, the other terminal being indicated at 3 and constituting the support for the work 4 to be joined by the rivet 5.

As is usual the head or terminal 1 works in guides 6 and is reciprocated toward and from the terminal or support 3 by any suitable means and in any desired manner. The lower part of the head 1 is enlarged as at 1′ and a recess or pocket 7 formed in the underneath surface.

8 indicates the work-engaging die or tool having a collar 9 on its upper end located within the recess 7 of the head 1. The collar 9 is of smaller width than the recess to permit it moving about therein.

10 indicates a ring or plate yieldingly secured to the head 1 by screw bolts 11, springs 12 being inserted between the heads of the screws and the plate 10. The shanks of the screw bolts 11 pass loosely through the plate 10. The plate 10 is provided with a central opening 13 through which the die 8 passes, said opening being considerably larger than the diameter of the die. The plate engages the under side of the collar 9 and holds the die to the head 1 yieldingly due to the springs 12 whereby manipulation of the die to all parallel positions in the head is permitted.

14 indicates a hand-hold of suitable insulating material keyed to the die 8 and by means of which the die is moved manually to any position desired. By means of this hand-hold or of any other suitable handle or lever projecting from the die 8, the die may be rotated to prevent it sticking to the work or to twist it loose in case it should stick. When the die is used to head as well as heat the rivet the end of it may be cup-shaped if desired as is usual.

The operation of the device is thought to be obvious. The work with the rivet shank protruding is placed on the lower die or support 2 and the upper die or tool 8 manipulated by hand until it is brought into exact line with the rivet. During this manipulation the collar 9 travels around in the recess 7, the springs 12 maintaining the die at all times in good electrical contact with the head 1. Upon bringing the die down onto the rivet and passing current therethrough and applying pressure, the rivet is headed in a manner now well known in the art.

While the invention is illustrated in an apparatus for acting on horizontally held plates whereby the die 8 is vertically disposed, it will be understood that the work may be held in vertical position and the apparatus arranged horizontally or in any intermediate position without departing from the spirit of the invention.

It will be understood that the invention is not limited to use with any particular style of rivet nor to any particular details of construction or arrangement of parts except as may be specified in the appended claims.

What I claim as my invention is:—

1. In an electric metal working machine, the combination with two terminals one of which is movable toward and away from the other and a work-engaging die or tool loosely attached to and carried by the movable terminal whereby it can be manually manipulated to any parallel position.

2. In an electric metal working machine, the combination with two terminals one movable toward and away from the other, and a work-engaging die or tool loosely mounted in a pocket in the movable terminal whereby it can be manipulated to bring the axis of the die to any parallel position.

3. In an electric metal working machine, the combination with two terminals one movable toward and away from the other and a work-engaging die or tool held to the movable terminal by spring pressure whereby it can be readily manipulated manually into any position to line it with the work.

4. In an electric metal working machine, the combination of a movable head forming one terminal of a transformer, a work-engaging tool or die carried by said head and a spring-backed plate adapted to secure said tool or die to the head as and for the purpose described.

5. In an electric metal working machine, a movable head forming one transformer terminal and provided with a recess, a work-engaging tool or die having a part disposed in said recess and adjustable therein and a spring-backed plate adapted to secure said tool to said head.

6. In an electric metal working machine, a movable head forming one terminal of a transformer and a work-engaging die or tool loosely attached direct to and carried by said head, whereby it can be manually adjusted thereon to line it exactly with the part of the work to be operated on.

7. In an electric metal working machine, a movable head forming one terminal of a transformer, an adjustable work-engaging die or tool secured direct to and carried by said head and an insulated hand grip on said tool as and for the purpose described.

8. In an electric metal working apparatus, the combination of a movable head forming one terminal of a transformer and a work-engaging tool or die mounted direct on and carried by said head, said tool or die being capable of rotary movement as well as being bodily adjustable into different parallel positions.

9. In an electric metal working apparatus, the combination of a movable head forming one terminal of a transformer and a work-engaging tool or die mounted direct to and carried by said head, said tool or die being manually rotatable and movable bodily in all lateral directions with relation to the work-engaging movement of said head.

Signed at Boston, in the county of Suffolk and Commonwealth of Massachusetts, this twelfth day of June, A. D. 1918.

GEORGE ALBERT CUTTER.

Witnesses:
F. C. MILDRAM,
MARY E. BOYLE.